US011529800B2

(12) United States Patent
Sloan

(10) Patent No.: US 11,529,800 B2
(45) Date of Patent: Dec. 20, 2022

(54) ULTRAVIOLET (UV) HEAT-ACTIVATED LAMINATING ADHESIVE FOR AN INKJET PRINTING PROCESS

(71) Applicant: Electronics for Imaging, Inc., Fremont, CA (US)

(72) Inventor: Donald A. Sloan, Parkville, MO (US)

(73) Assignee: ELECTRONICS FOR IMAGING, INC., Fremont, CA (US)

( * ) Notice: Subject to any disclaimer, the term of this patent is extended or adjusted under 35 U.S.C. 154(b) by 0 days.

(21) Appl. No.: 17/365,658

(22) Filed: Jul. 1, 2021

(65) Prior Publication Data
US 2022/0305768 A1    Sep. 29, 2022

Related U.S. Application Data

(60) Provisional application No. 63/166,402, filed on Mar. 26, 2021.

(51) Int. Cl.
*B32B 37/12* (2006.01)
*B32B 37/10* (2006.01)
(Continued)

(52) U.S. Cl.
CPC .......... *B32B 37/1284* (2013.01); *B32B 37/06* (2013.01); *B32B 37/10* (2013.01); *B32B 37/1207* (2013.01); *B32B 38/145* (2013.01); *B32B 2037/1253* (2013.01); *B32B 2309/125* (2013.01); *B32B 2310/0831* (2013.01);
(Continued)

(58) Field of Classification Search
CPC ............. B41M 5/0047; B32B 37/1284; B32B 37/1294; B32B 38/145
See application file for complete search history.

(56) References Cited

U.S. PATENT DOCUMENTS 4,904,436 A    2/1990 Rachal
2007/0297736 A1    12/2007 Sherman et al.
(Continued)

FOREIGN PATENT DOCUMENTS

WO    WO-2014011110 A1 *    1/2014 ............... B05D 5/06

OTHER PUBLICATIONS

"Carver 3888.1NE0 Hydraulic Press Test System, Automatic, 115 VAC, 60 Hz", Cole-Parmer; retrieved online from url: https://www.coleparmer.com/i/carver-3888-1ne0-hydraulic-press-test-system-automatic-115-vac-60-hz/5962030; copyright 2021, 2 pages.

*Primary Examiner* — Carson Gross
(74) *Attorney, Agent, or Firm* — Perkins Coie LLP

(57) ABSTRACT

Apparatus, compositions, and systems for ultraviolet (UV) heat-activated laminating adhesives applied via an inkjet printing process are disclosed. A system includes a first inkjet mechanism configured to deposit ink in a particular pattern onto a surface of a rigid medium. A second inkjet mechanism is configured to deposit a laminating adhesive onto the particular pattern printed on the surface of the rigid medium. A pair of stainless steel plates is configured to receive an overlay film layer and the laminating adhesive deposited onto the particular pattern printed on the surface of the rigid medium. The overlay film layer is positioned such that a surface of the overlay film layer faces the laminating adhesive. Pressure and heat are applied to the overlay film layer and the laminating adhesive to laminate the particular pattern printed on the surface of the rigid medium.

6 Claims, 8 Drawing Sheets

(51) Int. Cl.
 B32B 37/06 (2006.01)
 B32B 38/00 (2006.01)
 B41M 5/00 (2006.01)

(52) U.S. Cl.
 CPC ....... *B32B 2327/06* (2013.01); *B32B 2333/12* (2013.01); *B32B 2355/02* (2013.01); *B32B 2451/00* (2013.01); *B41M 5/0047* (2013.01)

(56) References Cited

U.S. PATENT DOCUMENTS

| | | | |
|---|---|---|---|
| 2009/0221408 A1 | 9/2009 | Cope et al. | |
| 2013/0045376 A1 | 2/2013 | Chen et al. | |
| 2017/0348955 A1* | 12/2017 | Back | B32B 38/145 |
| 2021/0155032 A1* | 5/2021 | Frings | B32B 27/304 |

* cited by examiner

ULTRAVIOLET (UV) HEAT-ACTIVATED LAMINATING ADHESIVE FOR AN INKJET PRINTING PROCESS

CROSS-REFERENCE TO RELATED APPLICATION

This application claims the benefit of U.S. Provisional Patent Application No. 63/166,402, filed Mar. 26, 2021, which is incorporated by reference in its entirety herein.

FIELD OF THE INVENTION

This description relates generally to laminating systems and specifically to ultraviolet (UV) heat-activated laminating adhesives applied via an inkjet printing process.

BACKGROUND

Traditional heat-activated adhesives typically use water-based or solvent-based inks. Such adhesives are typically applied using analog methods, such as flexo, rotogravure, offset, or screen printing. Traditional ink-and-coating systems can require extensive post-setup efforts, thus increasing the production time and costs for the final product. In addition, traditional analog formulations typically use harsher solvents and chemicals, which can result in environmental health hazards. For example, rotogravure is a preferred method used for printing in the luxury vinyl tile (LVT) market. However, rotogravure printing can require significant investments in gravure cylinders, sleeves, and plates. Especially for shorter print runs, such methods can be cost prohibitive.

SUMMARY

Apparatus, compositions, and systems for ultraviolet (UV) heat-activated laminating adhesives applied via an inkjet printing process are disclosed. In some embodiments, a system includes a first inkjet mechanism coupled to one or more actuators. The first inkjet mechanism is configured to deposit ink in a particular pattern onto a surface of a rigid medium when driven by the one or more actuators. A second inkjet mechanism is coupled to the one or more actuators and configured to deposit a laminating adhesive onto the particular pattern printed on the surface of the rigid medium when driven by the one or more actuators. A pair of stainless steel plates is coupled to the one or more actuators and configured to receive an overlay film layer and the laminating adhesive deposited onto the particular pattern printed on the surface of the rigid medium when driven by the one or more actuators. The overlay film layer is positioned such that a surface of the overlay film layer faces the laminating adhesive. Pressure is applied to the overlay film layer and the laminating adhesive to laminate the particular pattern printed on the surface of the rigid medium.

In some embodiments, a structure includes a rigid medium having a particular pattern printed on a first surface of the rigid medium by a first inkjet mechanism. A laminating adhesive is deposited, by a second inkjet mechanism, onto the particular pattern printed on the first rigid medium surface, An overlay film layer is positioned such that a first surface of the overlay film layer faces the laminating adhesive. A first stainless steel plate is positioned such that the first stainless steel plate faces a second surface of the rigid medium opposite the first surface of the rigid medium. A second stainless steel plate is positioned such that the second stainless steel plate faces a second surface of the overlay film layer opposite the first surface of the overlay film layer. The first stainless steel plate and the second stainless steel plate are configured to apply pressure to the overlay film layer and the laminating adhesive to laminate the particular pattern printed on the surface of the rigid medium.

In some embodiments, a method includes disposing, by an inkjet mechanism of a laminating system, a laminating adhesive onto a particular pattern printed on a surface of a rigid medium. A UV light source of the laminating system is used to cure the laminating adhesive. The laminating system positions an overlay film layer such that a surface of the overlay film layer faces the laminating adhesive. A pair of stainless steel plates of the laminating system apply heat to the laminating adhesive. The pair of stainless steel plates of the laminating system apply pressure to the overlay film layer, the laminating adhesive, and the rigid medium to laminate the overlay film layer onto the particular pattern printed on the surface of the rigid medium.

These and other aspects, features, and implementations can be expressed as methods, apparatus, systems, components, program products, means or steps for performing a function, and in other ways.

These and other aspects, features, and implementations will become apparent from the following descriptions, including the claims.

DETAILED DESCRIPTION

In the following description, for the purposes of explanation, numerous specific details are set forth in order to provide a thorough understanding of the present embodiments. It will be apparent, however, that the present embodiments may be practiced without these specific details.

This document presents systems, compositions, and apparatus for ultraviolet (UV) heat-activated laminating adhesives applied via an inkjet printing process. The embodiments disclosed herein present a UV inkjettable clear interface or bonding layer for applications requiring the thermal lamination of different types of films to digitally printed materials or inks. For example, lamination in luxury vinyl tile (LVT) applications is disclosed. The embodiments enable direct (non-contact) digital printing to media and replace traditional, analog rotogravure methods. Using UV digital printers, light-emitting diodes, and the inkjettable interface adhesives disclosed herein, thermal-laminated wear layers are applied to digitally printed films by application of heat and pressure. The embodiments provide the bond and peel strengths required for the LVT and related markets.

The advantages and benefits of the UV heat-activated laminating adhesives applied via inkjet printing using the embodiments described herein include an instantly on and instantly off print production process that reduces pre-production setup times. The costly investments in impression cylinders, sleeves, and plates is also reduced. In addition, traditional step and repeat patterns are eliminated. The embodiments obviate the need for harsh chemicals, reducing the associated production and operation costs. Moreover, the embodiments provide increased flexibility in the printing of short runs and one-offs when needed. Furthermore, a reduced ink volume is realized, resulting in cost savings.

Figure 1:
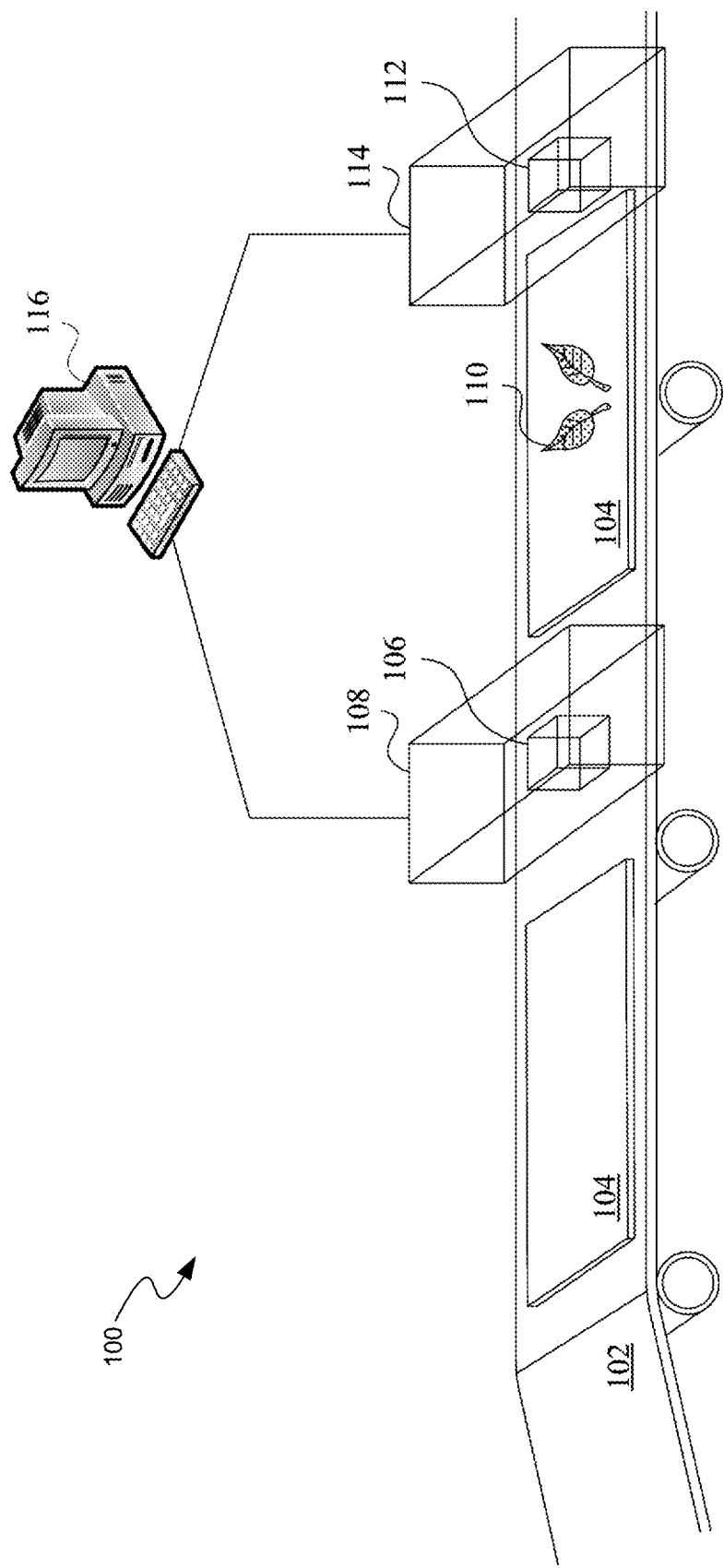
FIG. 1 is a block diagram illustrating a perspective view of a printing system, in accordance with one or more embodiments.

FIG. 1 is a block diagram illustrating a perspective view of a printing system 100, in accordance with one or more embodiments. The printing system 100 includes a printer head 106, at least one light source 112, and a transfer belt 102. Embodiments may include various combinations of these and other components, e.g., a dryer. For example, the light source 112 may be present in some embodiments, but not in others. As another example, a dryer may be included if an image 110 will not be quickly transferred to a substrate. While the printing system 100 of FIG. 1 includes a transfer belt 102, other means for conveying and/or retaining a transfer material 104 can also be used, such as a rotating platform or stationary bed.

The printer head 106 is configured to deposit ink onto a transfer material 104 in the form of an image 110. The transfer material 104, which may also be referred to as a former material, is flexible, which allows the image 110 to be transferred to complex-shaped substrates. For example, the transfer material 104 may be a rubber former, a thermoformable material, etc. In some embodiments, the printer head 106 is an inkjet printer head that jets ink onto the transfer material 104 using, for example, piezoelectric nozzles. Thermal printer heads are generally avoided in an effort to avoid premature sublimation of the ink. In some embodiments, the ink is a solid energy, e.g., UV curable ink. However, other inks may also be used, such as water-based energy curable inks or solvent-based energy curable inks. The ink can be deposited in different forms, such as ink droplets and colored polyester ribbons.

In some embodiments, one or more light sources 112 cure some or all of the ink deposited onto the transfer material 104 by emitting UV radiation. The light source(s) 112 may be, for example, a UV fluorescent bulb, a UV light emitting diode (LED), a low-pressure, e.g., mercury (Hg), bulb, or an excited dimer (excimer) lamp and/or laser. Various combinations of these light sources could be used. For example, a printing system 100 may include a low-pressure Hg lamp and a UV LED, As discussed in more detail with reference to FIG. 2, the light source 112 may be configured to emit UV radiation of a particular subtype.

The printer head 106 and light source 112 are illustrated as being directly adjacent to one another, i.e., neighboring without any intervening components. However, additional components that assist in printing, curing, etc., may also be present. For example, multiple distinct light sources 112 may be positioned behind the printer head 106. FIG. 1 illustrates one possible order in which components may be arranged in order to print an image 110 onto the transfer material 104. Other embodiments are considered in which additional components are placed before, between, or after the illustrated components, etc.

In some embodiments, one or more of the aforementioned components are housed within one or more carriages. For example, the printer head 106 can be housed within a printing carriage 108, the light source 112 can be housed within a curing carriage 114, etc. In addition to protecting the components from damage, the carriages may also serve other benefits. For example, the curing carriage 114 can limit what portion(s) of the transfer material 104 and image 110 are exposed during the curing process. The printing system 100 may include pulleys, motors, rails, and/or any combination of mechanical or electrical technologies that enable the carriages to travel along the transfer belt 102, i.e., with respect to the transfer material 104. In alternative embodiments, the carriages can be fixedly attached to a rail or base of the printing system 100. In these embodiments, the transfer material 104 can be moved in relation to the printer head 106, light source 112, etc., such that ink can be deposited onto the transfer material 104.

In various embodiments, some or all of the components are controlled by a computer system 116. The computer system 116 is the same as or similar to the computer system 500 illustrated and described in more detail with reference to FIG. 5. The computer system 116 can allow a user to input printing instructions and information, modify print settings, e.g., by changing cure settings, alter the printing process, etc.

Figure 2:
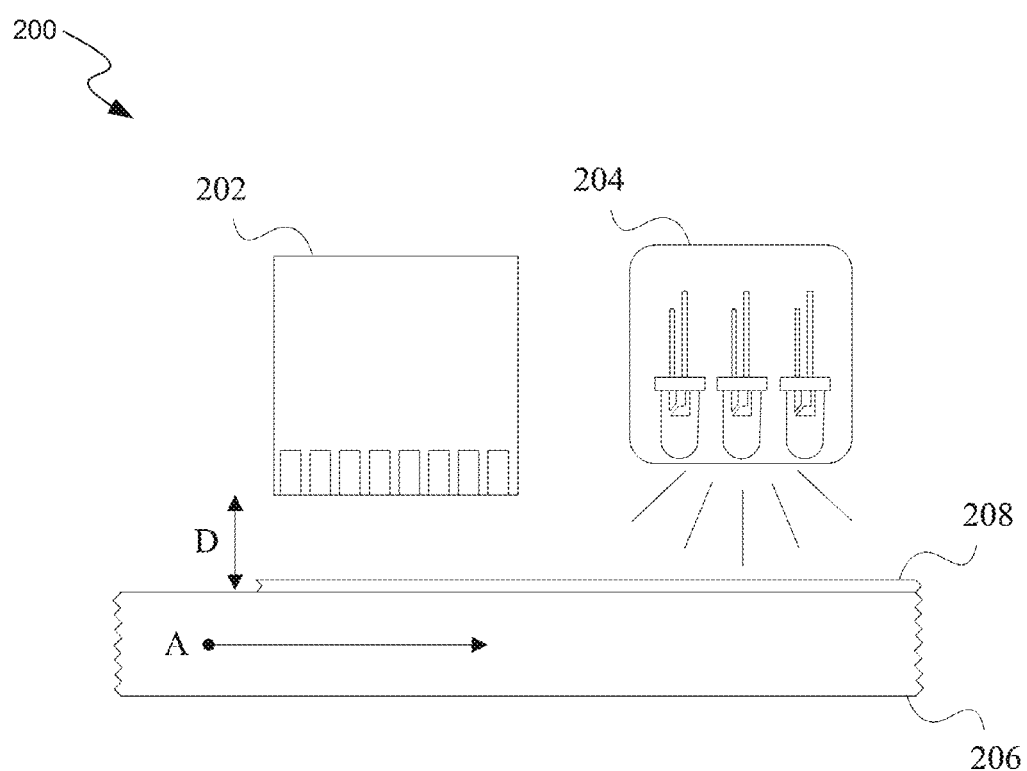
FIG. 2 is a block diagram illustrating a side view of a printing system, including a printer head and a light source, in accordance with one or more embodiments.

FIG. 2 is a block diagram illustrating a side view of a printing system 200, including a printer head 202 and a light source 204, in accordance with one or more embodiments. While a single-pass configuration is illustrated by FIG. 2, other embodiments may employ multi-pass, i.e., scan, configurations. Similarly, embodiments can be modified for various printers, e.g., flatbed printer, drum printer, or lane printer. For example, a flatbed printer may include a stable bed and a traversing printer head, a stable printer head and a traversing bed, etc.

The printer head 202 can include distinct ink/color drums, e.g., cyan, magenta, yellow, and key (CMYK), or colored polyester ribbons that are deposited onto the surface of a transfer material 206. Path A represents the media feed direction, e.g., the direction in which the transfer material 206 travels during the printing process. Path D represents the distance between the printer head 202 and the surface of the transfer material 206.

As described above, both direct and indirect printing have conventionally been carried out only on flat surfaces. The printing systems and methods described herein, however, allow images to be printed on complex-shaped, i.e., non-planar, surfaces by depositing ink directly onto a transfer material 206 and then transferring the ink to a substrate. When printing directly onto a surface, print quality relies on accuracy of ink drop placement. Therefore, maintaining a constant or nearly constant distance between the printer head 202 and the flat surface of the transfer material 206 is necessary. Airflow, velocity variability, etc., can affect drop placement even when the change in distance is small, e.g., a few millimeters.

In some embodiments, a light source 204 cures some or all of the ink 208 deposited onto the transfer material 206 by the printer head 202. The light source 204 may be configured to emit wavelengths of UV electromagnetic radiation of subtype V (UVV), subtype A (UVA), subtype B (UVB), subtype C (UVC), or any combination thereof. Generally, UVV wavelengths are those wavelengths measured between 395 nanometers (nm) and 445 nm, UVA wavelengths measure between 315 nm and 395 nm, UVB wavelengths measure between 280 nm and 315 nm, and UVC wavelengths measure between 100 nm and 280 nm. However, one skilled in the art will recognize these ranges are somewhat adjustable. For example, some embodiments may characterize wavelengths of 285 nm as UVC.

The light source 204 may be, for example, a fluorescent bulb, a light emitting diode (LED), a low-pressure, e.g., mercury (Hg), bulb, or an excited dimer (excimer) lamp/laser. Combinations of different light sources could be used in some embodiments. Generally, the light source 204 is selected to ensure that the curing temperature does not exceed the temperature at which the ink 208 begins to sublime. For example, light source 204 of FIG. 2 is a UV LED lamp that generates low heat output and can be used for a wider range of former types. UV LED lamps are associated with lower power consumption, longer lifetimes, and more predictable power output.

Other curing processes may also be used, such as epoxy (resin) chemistries, flash curing, and electron beam technology. One skilled in the art will appreciate that many different curing processes could be adopted that utilize specific timeframes, intensities, rates, etc. The intensity may increase or decrease linearly or non-linearly, e.g., exponentially, logarithmically. In some embodiments, the intensity may be altered using a variable resistor or alternatively by applying a pulse-width-modulated (PWM) signal to the diodes in the case of an LED light source.

Figure 3:
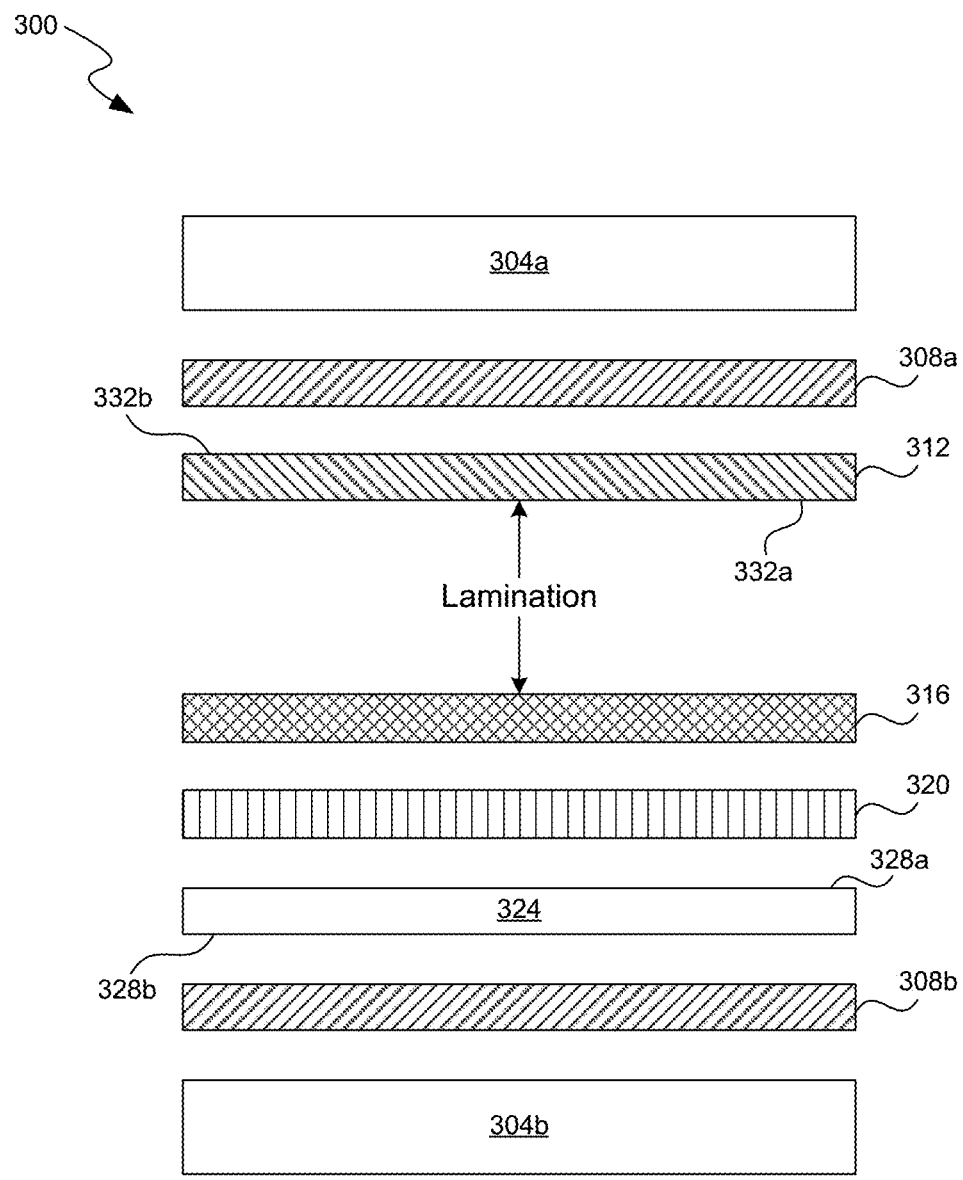
FIG. 3 is a block diagram illustrating a system for applying ultraviolet (UV) heat-activated laminating adhesives via an inkjet printing process, in accordance with one or more embodiments.

FIG. 3 is a block diagram illustrating a system 300 for applying ultraviolet (UV) heat-activated laminating adhesives via an inkjet printing process, in accordance with one or more embodiments. The system 300 can be implemented using the components illustrated and described in more detail with reference to FIGS. 1, 2, and 5. Likewise, other embodiments include different and/or additional components, or are connected in a different manner.

The system includes one or more actuators that are used to position and move components such as a transfer belt, other means for conveying and/or retaining transfer material such as a rotating platform or stationary bed, or a printer head. The transfer belt is the same as or similar to the transfer belt 102 illustrated and described in more detail with reference to FIG. 1. The printer head is the same as or similar to the printer head 106 illustrated and described in more detail with reference to FIG. 1. A first inkjet mechanism is coupled to the one or more actuators and configured to deposit ink 320 in a particular pattern onto a surface 328a of a rigid medium 324 when driven by the one or more actuators. For example, a printer head is configured to deposit the ink 320 onto the rigid medium 324 in the form of an image (the particular pattern), as illustrated and described in more detail with reference to FIG. 1, The system 300 is configured to apply a UV thermal-laminating interface adhesive layer 316 or coating using inkjet technology over UV-cured digitally printed graphics, creating a bond or wear layer. The embodiments disclosed herein enable lamination of different types of film, such as PVC printed graphics, onto different types of rigid media. The lamination is performed using a lamination press, e.g., the lamination press 700 illustrated and described in more detail with reference to FIG. 7.

In some embodiments, the particular pattern is printed on a surface 328a of the rigid medium 324 by the first inkjet mechanism. The rigid medium 324 includes at least one of polyvinyl chloride (PVC), poly(methyl methacrylate) (PMMA), acrylonitrile butadiene styrene (ABS), or luxury vinyl tile (LVT). PVC is a synthetic plastic polymer. PMMA, also known as acrylic, acrylic glass, or plexiglass, is a transparent thermoplastic used in sheet form as a lightweight or shatter-resistant alternative to glass. ABS is a common thermoplastic polymer having favorable mechanical properties such as impact resistance, toughness, and rigidity. LVT is a finished flooring material used in commercial and institutional applications. LVT is composed of colored PVC chips formed into solid sheets of varying thicknesses by heat and pressure. The embodiments disclosed herein can be implemented in the LVT market and for construction that requires a post-print finishing thermolamination or bonding process of digitally printed films to rigid core materials. Additional printing applications using ABS, PVC, and PMMA also benefit from the disclosed embodiments, including shower and bath enclosures, automotive interior trim, secure credit cards, and luxury boats and yachts.

A second inkjet mechanism is coupled to the one or more actuators and configured to deposit the laminating adhesive 316 onto the particular pattern printed on the surface 328a of the rigid medium 324 when driven by the one or more actuators. In some embodiments, the laminating adhesive 316 is deposited onto the particular pattern printed on the surface 328a of the rigid medium 324. In some embodiments, the first inkjet mechanism is the same as the second inkjet mechanism.

In some embodiments, the laminating adhesive 316 includes at least one of monomers, oligomers, at least one photoiniator, surfactants, and polymer resins. To maintain a preferred balance of cure, wetting, and peel strength properties, a preferred balance of the monomers, oligomers, photoiniator, surfactants, and polymer resins is used. Typically, monomers are monofunctional in nature. Difunctional components can be used to a certain percentage point to achieve a particular degree of surface cure or surface hardness to prevent the coating from sticking to a block once roped onto a cylinder for processing. For example, a preferred glass transition temperature (TG) of the monomers and oligomers is in a range from +5° to −20° degrees Celsius to maintain surface cure and tack to achieve a desired peel strength for the laminating process.

In some embodiments, the laminating adhesive 316 includes Norrish Type 1. Norrish Type 1 refers to a photochemical cleavage or homolysis of aldehydes and ketones into two free radical intermediates (α-scission). The laminating adhesive 316 is configured to absorb UV radiation of subtype A (UVA) having a wavelength in a range of 320 to 400 nanometers (nm). A preferred photoiniator is Norrish Type 1, which absorbs UVA-long wavelengths between 320 and 400 nm. Preferred photoiniator concentration levels are between 1% and 8% by weight to prevent overdosing or underdosing the photoiniator percentage point to avoid a negative outcome on the peel strength of the coating.

In some embodiments, the laminating adhesive 316 includes at least one of a polymer, a C9 hydrocarbon resin, or a triblock co-polymer based on styrene ethylene butylene (SEB). SEB is a thermoplastic elastomer (TPE) that can behave like rubber without undergoing vulcanization. For example, a preferred formulation includes polymers such as C9 hydrocarbon resins and triblock co-polymers based on SEB. C9 hydrocarbon resin can be used as a tackifier resin for manufacturing of pressure sensitive adhesives. C9 polymers and SEB polymers have a softening point between 45° and 100° Celsius. Such polymers can be used in a preferred formulation because of the preferred melting point and softening point of the polymers. When the polymers reach their specific softening point temperature, the polymers transform into a tacky state. The tacky state is the mechanism, which enables the surface of the coating or interface layer (laminating adhesive 316) that allows the PVC or an overlay film layer 312 to achieve a specific bond strength or peel strength once it returns to room temperature.

In some embodiments, a proportion of rubber within the laminating adhesive 316 is greater than a proportion of styrene within the laminating adhesive 316. Triblock styrene-ethylene/butylene-styrene (SEBS), styrene-ethylene/propylene-styrene (SEPS), and G Enhanced Rubber Segment (G ERS) polymers influence the TG of the laminating adhesive 316 interface coating to control the surface hardness as a finished part ages or prolong the shelf life of the printed/coated material, Triblock SEBS polymers are a blend of styrene and rubber; hence a preferred ratio of styrene to rubber is selected to maintain a proper balance between the coating surface being too soft or possibly too hard. For example, a styrene to rubber ratio of 33/67 yields a harder surface, creating a negative effect on the peel strength of the interface coating. A styrene to rubber ratio of 28/72 has a more positive effect due to the higher percentage of rubber, which helps maintain the correct balance of hardness to softness.

The system 300 includes a UV light source coupled to the one or more actuators. The UV light source is the same as or similar to the light source 204 illustrated and described in more detail with reference to FIG. 2. The UV light source is configured to cure the particular pattern printed on the surface 328a of the rigid medium 324. The UV light source is configured to cure the laminating adhesive 316 deposited onto the particular pattern printed on the surface 328a of the rigid medium 324.

A pair of stainless steel plates 308a, 308b is coupled to the one or more actuators. The pair of stainless steel plates 308a, 308b is configured to receive an overlay film layer 312 and the laminating adhesive 316 deposited onto the particular pattern printed on the surface 328a of the rigid medium 324 when driven by the one or more actuators. In some embodiments, the overlay film layer 312 includes at least one of PVC or PMMA. The overlay film layer 312 is positioned such that a surface 332a of the overlay film layer 312 faces the laminating adhesive 316 as shown in FIG. 3.

In some embodiments, the first stainless steel plate 308b is positioned such that the first stainless steel plate 308b faces a surface 328b of the rigid medium 324 opposite the surface 328a of the rigid medium 324. The second stainless steel plate 308a is positioned such that the second stainless steel plate 308a faces a surface 332b of the overlay film layer 312 opposite the surface 332a of the overlay film layer 312. The first stainless steel plate 308b and the second stainless steel plate 308a are configured to apply pressure to the overlay film layer 312 and the laminating adhesive 316 to laminate the particular pattern printed on the surface 328a of the rigid medium 324.

The laminating process takes place between two heated platens 304a, 304b. Each platen is heated to a preferred temperature of 260° F. to 300° F., which is the softening point of the interface laminating adhesive 316. When the platens 304a, 304b reach this temperature, the printed part (rigid medium 324) with the laminating adhesive layer 316 is placed over the overlay film layer 312 and inserted in between the two stainless steel plates 308a, 308b. The system 300 includes a pair of platens 304a, 304b coupled to the one or more actuators. The pair of platens 304a, 304b is configured to receive heat from a heat source. The pair of platens 304a, 304b is configured to apply the heat and pressure to the steel plates when driven by the one or more actuators. In some embodiments, a first platen 304b is positioned such that the first stainless steel plate 308b is between the first platen 304b and the rigid medium 324. The first platen 304b is configured to be heated to a temperature in a range from 260° F. to 300° F. The second platen 304a is positioned such that the second stainless steel plate 308a is between the second platen 304a and the overlay film layer 312. The second platen 304a is also configured to be heated to the temperature.

In some embodiments, the system 300 includes a lamination press coupled to the one or more actuators. An example lamination press 700 is illustrated and described in more detail with reference to FIG. 7. The lamination press drives the one or more actuators and conveys the heat from the heat source to the pair of platens 304a, 304b. In some embodiments, the pressure applied is in a range from 1000 to 1800 pound-force (lbf). The pressure is applied for two to four minutes. For example, the pair of stainless steel plates 308a, 308b is placed on the lamination press for pressure to be applied from the platens 304a, 304b to the pair of stainless steel plates 308a, 308b, The pressure varies depending on how many parts are laminated and the thickness of the laminate film (overlay film layer 312). A preferred pressure used is 1000 to 1800 lbf for two to four minutes. The time depends on a number of parts stacked between the platens 304a, 304b. The pair of stainless steel plates 308a, 308b is configured to apply the heat to the overlay film layer 312 and the laminating adhesive 316 when driven by the one or more actuators. The system 300 applies the pressure to the overlay film layer 312 and the laminating adhesive 316 to laminate the particular pattern printed on the surface 328a of the rigid medium 324.

In some embodiments, the pair of stainless steel plates 308a, 308b is configured to create a bond between the overlay film layer 312 and the rigid medium 324 using the laminating adhesive 316. The bond has a peel strength greater than 7 pound-force (lbf) or 31.1376 newtons (n). A high level of surfactants in the laminating adhesive 316 enable the surface of the inked layer (rigid medium 324) to create a bond to the wear layer (overlay film layer 312) of the final product. Thus, once the interface layer (laminating adhesive 316) is applied, it is thermally laminated either in-line or off-line to bond different types of film, such as PVC, to other inks or media. The embodiments disclosed herein create a bond between the interface layer (laminating adhesive 316) and the wear layer (overlay film layer 312), creating a peel strength greater than 7 lbf or 31.1376 n.

The laminating system cools the rigid medium 324 for twenty-four to thirty-six hours after applying the pressure. For example, once the laminating process is complete, the parts are allowed to cool to room temperature and sit for twenty-four to thirty-six hours before the peel strength properties of the finished part are tested. The peel strength properties vary depending on the application. For example, the peel strength for the LVT market is greater than 7 lbf or 31.1376 n, which is the amount of force it takes to pull two bonded pieces of material apart. The greater the number in lbf, the higher the bonding strength between a surface of the interface layer (laminating adhesive 316) and the laminating material (overlay film layer 312).

Figure 4:
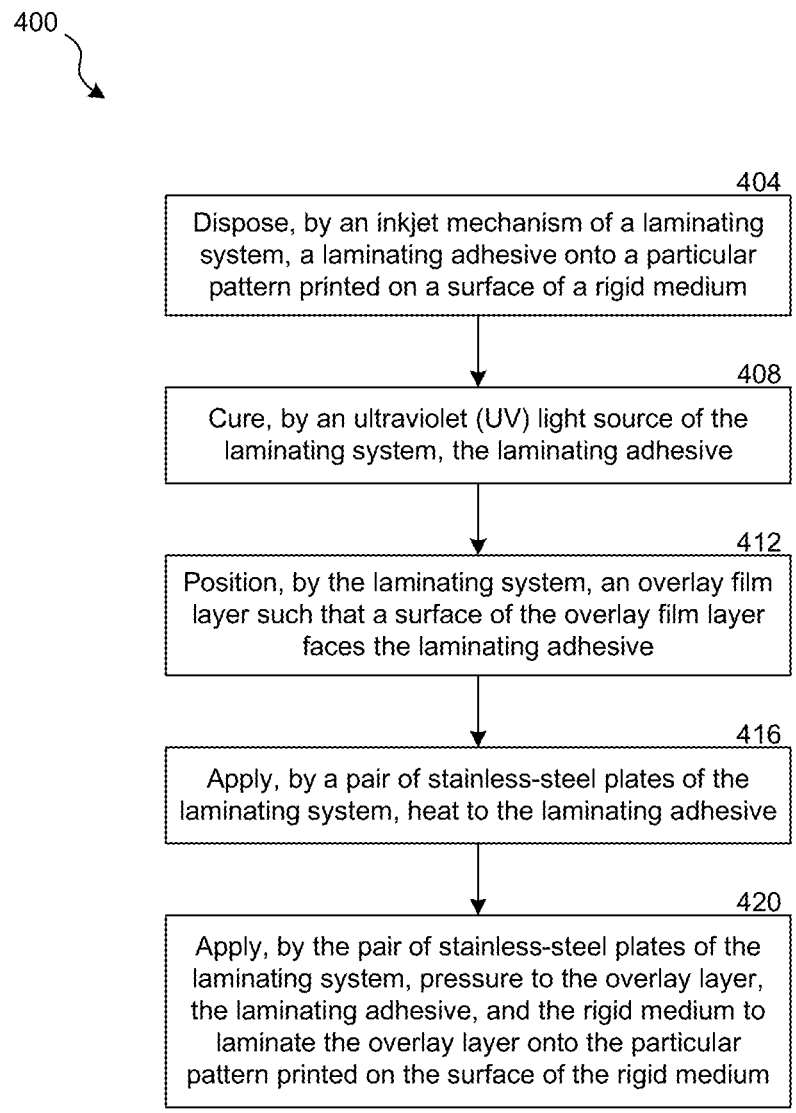
FIG. 4 is a flow diagram illustrating a process for applying UV heat-activated laminating adhesives via inkjet printing, in accordance with one or more embodiments.

FIG. 4 is a flow diagram illustrating a process 400 for applying UV heat-activated laminating adhesives via inkjet printing, in accordance with one or more embodiments. In some embodiments, the process 400 of FIG. 4 is performed using a laminating system, e.g., the system 300 illustrated and described in more detail with reference to FIG. 3. In other embodiments, the process 400 of FIG. 4 is performed using the components illustrated and described in more detail with reference to FIGS. 1, 2, and 5. Likewise, other embodiments include different and/or additional steps; or are performed in a different order.

An inkjet mechanism of the laminating system deposits (404) a laminating adhesive onto a particular pattern printed on a surface of a rigid medium. The laminating adhesive is the same as or similar to the laminating adhesive 316 illustrated and described in more detail with reference to FIG. 3. The rigid medium and surface are the same as or similar to the rigid medium 324 and surface 328*a* illustrated and described in more detail with reference to FIG. 3. In some embodiments, the laminating adhesive includes at least one of monomers, oligomers, at least one photoiniator, surfactants, and polymer resins. To maintain a preferred balance of cure, wetting, and peel strength properties, a preferred balance of the monomers, oligomers, photoiniator, surfactants, and polymer resins is used. Typically, monomers are monofunctional in nature. Difunctional components can be used to a certain percentage point to achieve a particular degree of surface cure or surface hardness to prevent the coating from sticking to a block once rolled onto a cylinder for processing.

A UV light source of the laminating system cures (408) the laminating adhesive 316. The UV light source is the same as or similar to the light source 204 illustrated and described in more detail with reference to FIG. 2.

The laminating system positions (412) an overlay film layer such that a surface of the overlay film layer faces the laminating adhesive. The overlay film layer and its surface are the same as or similar to the overlay film layer 312 and surface 332*a* illustrated and described in more detail with reference to FIG. 3. In some embodiments, the overlay film layer includes at least one of PVC or PMMA. The overlay film layer is positioned such that a surface of the overlay film layer faces the laminating adhesive, as shown in FIG. 3.

The lamination is performed using a lamination press, e.g., the lamination press 700 illustrated and described in more detail with reference to FIG. 7. A pair of stainless steel plates of the laminating system apply (416) heat to the laminating adhesive. The pair of stainless steel plates is the same as or similar to the pair of stainless steel plates 308*a*, 308*b* illustrated and described in more detail with reference to FIG. 3. The laminating process takes place between two heated platens. The platens are the same as or similar to the platens 304*a*, 304*b* illustrated and described in more detail with reference to FIG. 3. Each platen is heated to a preferred temperature of 260° F. to 300° F., which is the softening point of the interface laminating adhesive. When the platens reach this temperature, the printed part (rigid medium) with the laminating adhesive layer is placed over the overlay film layer and inserted in between the two stainless steel plates.

The pair of stainless steel plates of the laminating system apply (420) pressure to the overlay film layer, the laminating adhesive, and the rigid medium to laminate the overlay film layer onto the particular pattern printed on the surface of the rigid medium. The pressure varies depending on how many parts are laminated and the thickness of the laminate film (overlay film layer). A preferred pressure used is 1000 to 1800 lbf for two to four minutes. The time depends on a number of parts stacked between the platens.

Figure 5:
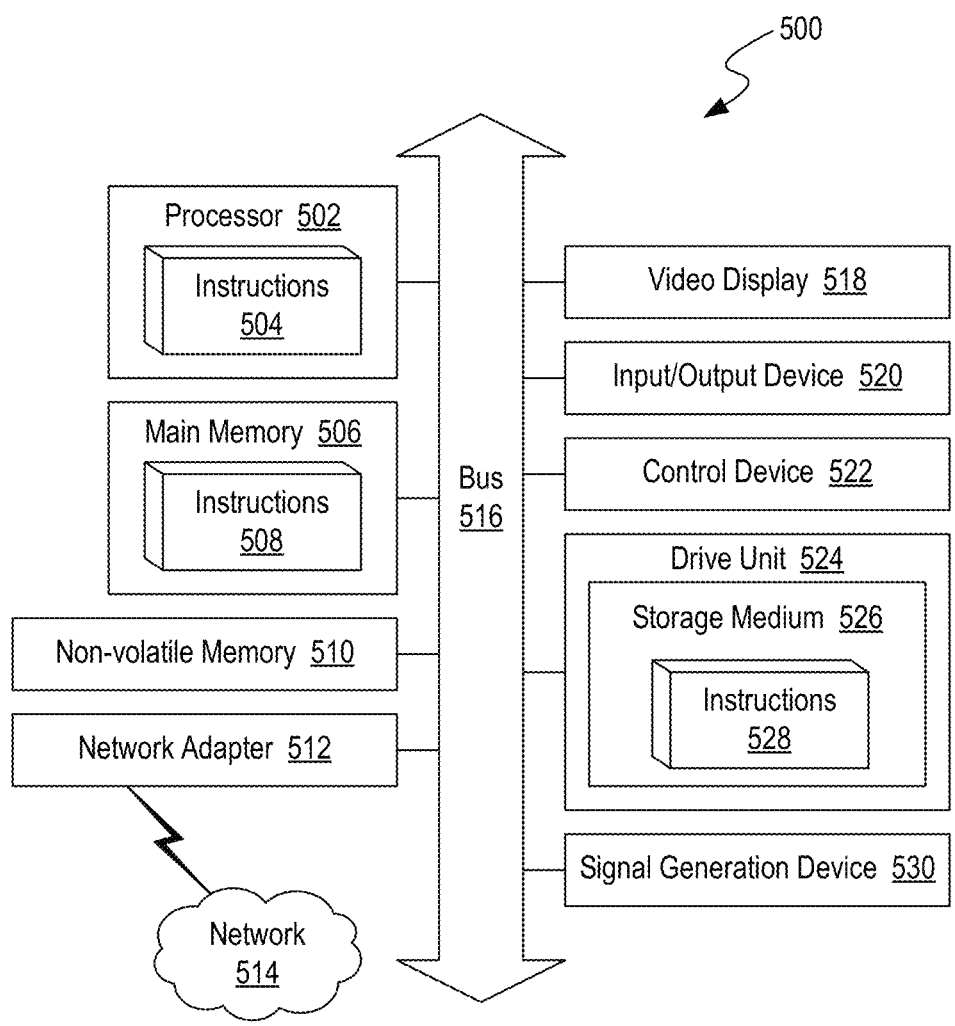
FIG. 5 is a block diagram illustrating an example computer system, in accordance with one or more embodiments.

FIG. 5 is a block diagram illustrating an example computer system 500, in accordance with one or more embodiments. Components of the example computer system 500 can be used to implement the systems illustrated and described in more detail with reference to FIGS. 1, 2, and 3. At least some operations described with reference to FIG. 4 can be implemented on the computer system 500.

The computer system 500 can include one or more central processing units ("processors") 502, main memory 506, non-volatile memory 510, network adapter 512 (e.g., network interface), video display 518, input/output devices 520, control device 522 (e.g., keyboard and pointing devices), drive unit 524 including a storage medium 526, and a signal generation device 530 that are communicatively connected to a bus 516. The bus 516 is illustrated as an abstraction that represents one or more physical buses and/or point-to-point connections that are connected by appropriate bridges, adapters, or controllers. The bus 516, therefore, can include a system bus, a Peripheral Component Interconnect (PCI) bus or PCI-Express bus, a HyperTransport or industry standard architecture (ISA) bus, a small computer system interface (SCSI) bus, a universal serial bus (USB), an IIC (I2C) bus, or an Institute of Electrical and Electronics Engineers (IEEE) standard 1394 bus (also referred to as "Firewire").

The computer system 500 can share a similar computer processor architecture as that of a desktop computer, tablet computer, personal digital assistant (PDA), mobile phone, game console, music player, wearable electronic device (e.g., a watch or fitness tracker), network-connected ("smart") device (e.g., a television or home assistant device), virtual/augmented reality system (e.g., a head-mounted display), or another electronic device capable of executing a set of instructions (sequential or otherwise) that specify action(s) to be taken by the computer system 500.

While the main memory 506, non-volatile memory 510, and storage medium 526 (also called a 'machine-readable medium') are shown to be a single medium, the term "machine-readable medium" and "storage medium" should be taken to include a single medium or multiple media (e.g., a centralized/distributed database and/or associated caches and servers) that store one or more sets of instructions 528. The term "machine-readable medium" and "storage medium" shall also be taken to include any medium that is capable of storing, encoding, or carrying a set of instructions for execution by the computer system 500.

In general, the routines executed to implement the embodiments of the disclosure may be implemented as part of an operating system or a specific application, component, program, object, module, or sequence of instructions (collectively referred to as "computer programs"). The computer programs typically include one or more instructions (e.g., instructions 504, 508, 528) set at various times in various memory and storage devices in a computing device. When read and executed by the one or more processors 502, the instruction(s) cause the computer system 500 to perform operations to execute elements involving the various aspects of the disclosure.

Moreover, while embodiments have been described in the context of fully functioning computing devices, those skilled in the art will appreciate that the various embodiments are capable of being distributed as a program product in a variety of forms. The disclosure applies regardless of the particular type of machine or computer-readable media used to actually effect the distribution.

Further examples of machine-readable storage media, machine-readable media, or computer-readable media include recordable-type media such as volatile and non-volatile memory devices 510, floppy and other removable disks, hard disk drives, optical disks (e.g., Compact Disk Read-Only Memory (CD-ROMS), Digital Versatile Disks (DVDs)), and transmission-type media such as digital and analog communication links.

The network adapter 512 enables the computer system 500 to mediate data in a network 514 with an entity that is external to the computer system 500 through any communication protocol supported by the computer system 500 and the external entity. The network adapter 512 can include a network adapter card, a wireless network interface card, a router, an access point, a wireless router, a switch, a multilayer switch, a protocol converter, a gateway, a bridge, a bridge router, a hub, a digital media receiver, and/or a repeater.

The network adapter 512 may include a firewall that governs and/or manages permission to access/proxy data in a computer network and tracks varying levels of trust between different machines and/or applications. The firewall can be any number of modules having any combination of hardware and/or software components able to enforce a predetermined set of access rights between a particular set of machines and applications, machines and machines, and/or applications and applications (e.g., to regulate the flow of traffic and resource sharing between these entities). The firewall may additionally manage and/or have access to an access control list that details permissions including the access and operation rights of an object by an individual, a machine, and/or an application, and the circumstances under which the permission rights stand.

Figure 6:
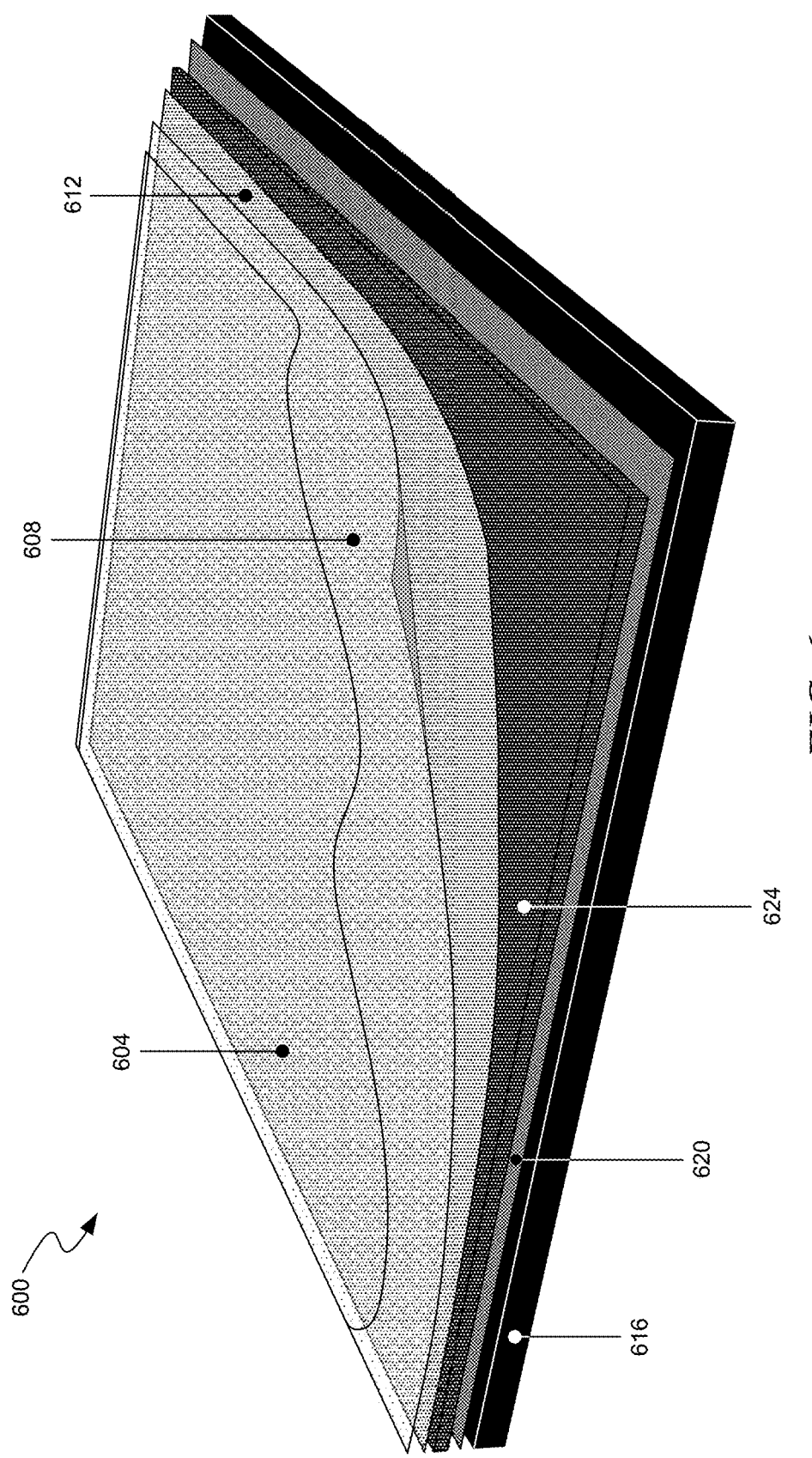
FIG. 6 is a perspective view of a structure created by applying UV heat-activated laminating adhesives via inkjet printing, in accordance with one or more embodiments.

FIG. 6 is a perspective view of a structure 600 created by applying UV heat-activated laminating adhesives via inkjet printing, in accordance with one or more embodiments. The structure 600 depicts an LVT structure including a series of layers. The structure 600 includes an overlay film layer 608, a pigment layer 612, a first PVC layer 616, a fiberglass layer 620, and a second PVC layer 624. In some embodiments, the structure 600 includes an optional UV coating layer 604.

First one or more inkjet printheads of a system deposit ink onto a surface of the pigment layer 612. The pigment layer 612 is to be laminated onto a rigid medium. The pigment layer 612 is a thin, flexible layer of white or light-colored PVC that is printed using the ink. The first one or more inkjet printheads are each similar to or the same as the printer head 106 illustrated and described in more detail with reference to FIG. 1 or the printer head 202 illustrated and described in more detail with reference to FIG. 2. The ink is the same as or similar to the ink 320 illustrated and described in more detail with reference to FIG. 3. The ink is deposited between the overlay film layer 608 and the pigment layer 612, i.e., before the overlay film layer 608 is applied onto the printed pigment layer 612.

In some embodiments, the system is a production printing and capture system for premium-margin large format jobs having grayscale and hybrid flatbed/roll-fed print capability. In other embodiments, the system is a production-level capability, ultra-high image quality, and rugged-reliability hybrid flatbed/roll-fed printing platform. In other embodiments, the system produces deep-draw, thermoformed and other custom applications by imaging direct to substrate.

In other embodiments, the system is the same as or similar to the printing system 100 illustrated and described in more detail with reference to FIG. 1 or the printing system 200 illustrated and described in more detail with reference to FIG. 2. The pigment layer 612 is made of PVC that can be printed using the embodiments described herein, rolled up, and transported off-line to a lamination line (lamination press) in production of LVTs. Depositing the ink onto the surface of the pigment layer 612 transforms the pigment layer 612 into a decorative printed film to be laminated onto the rigid medium to construct LVTs. The lamination is performed using a lamination press, e.g., the lamination press 700 illustrated and described in more detail with reference to FIG. 7.

Prior to curing and rolling up the pigment layer 612, second one or more inkjet printheads of the system deposit a laminating adhesive onto the surface of the pigment layer 612, such that the laminating adhesive coats the ink. The second one or more inkjet printheads are each similar to or the same as the printer head 106 illustrated and described in more detail with reference to FIG. 1 or the printer head 202 illustrated and described in more detail with reference to FIG. 2. The laminating adhesive is the same as or similar to the laminating adhesive 316 illustrated and described in more detail with reference to FIG. 3. In some embodiments, the laminating adhesive is a clear coat or a UV inkjettable clear interface (bonding layer) for applications requiring the thermal lamination of different types of films to digitally printed materials or inks. The laminating adhesive is deposited between the overlay film layer 608 and the pigment layer 612, i.e., before the overlay film layer 608 is applied onto the printed pigment layer 612. In some embodiments, the laminating adhesive includes Norrish Type 1.

The laminating adhesive is configured to absorb UV radiation. One or more UV light sources cure the ink and the laminating adhesive on the surface of the pigment layer 612 using the UV radiation. In some embodiments, the laminating adhesive is configured to absorb UV radiation of subtype A (UVA) having a wavelength in a range of 320 to 400 nanometers (nm). One or more UV light sources of the system cure the ink and the laminating adhesive before the pigment layer 612 is rolled up. The one or more UV light sources are the same as or similar to the one or more light sources 112 illustrated and described in more detail with reference to FIG. 1 or the light source 204 illustrated and described in more detail with reference to FIG. 2. The curing process is illustrated and described in more detail with reference to FIGS. 1 and 2. One or more actuators of the system roll up the printed and cured pigment layer 612 to be transported to a lamination press.

The laminating adhesive is configured to bond the overlay film layer 608 to the pigment layer 612 (during lamination). The overlay film layer 608 is the same as or similar to the overlay film layer 312 illustrated and described in more detail with reference to FIG. 3. The bond has a peel strength greater than 7 pound-force (lbf) or 31.1376 newtons (n). In some embodiments, the laminating adhesive is configured to bond the overlay film layer 608 to the pigment layer 612 at a temperature in a range from 260° F. to 300° F. In some embodiments, the laminating adhesive includes at least one of monomers, oligomers, at least one photoiniator, surfactants, or polymer resins. In some embodiments, the laminating adhesive includes at least one of a polymer, a C9 hydrocarbon resin, or a triblock co-polymer based on SEB. In some embodiments, a first proportion of rubber within the laminating adhesive is greater than a second proportion of styrene within the laminating adhesive.

In some embodiments, the structure 600 includes the pigment layer 612 having ink deposited thereupon by the first one or more inkjet printheads. The pigment layer 612 has the laminating adhesive deposited thereupon by the second one or more inkjet printheads, such that the ink is coated by the laminating adhesive. The laminating adhesive is configured to absorb UV radiation. The ink and the laminating adhesive are cured by the one or more UV light sources using the UV radiation. The pigment layer 612 shown in FIG. 6 is to be laminated onto a rigid medium. The rigid medium is sometimes referred to as a "PVC carrier board." The rigid medium includes the first PVC layer 616, the fiberglass layer 620, and the second PVC layer 624. In some embodiments, the cured pigment layer 612 is laminated onto wood, marble, or layers of vinyl instead of a PVC carrier board.

In some embodiments, the structure 600 includes an optional UV coating layer 604. The overlay film layer 608 is laminated over the printed and cured pigment layer 612 onto the rigid medium to create LVTs. In some embodiments, the structure 600 further includes an optional stability layer that helps the LVT product to lie flat and level for flooring implementation, while still being flexible enough to cut through with a knife. In some embodiments, the structure 600 includes an optional photographic layer that provides ornamental design, while an additional optional PVC wear layer protects the flooring from wear and tear.

Figure 7:
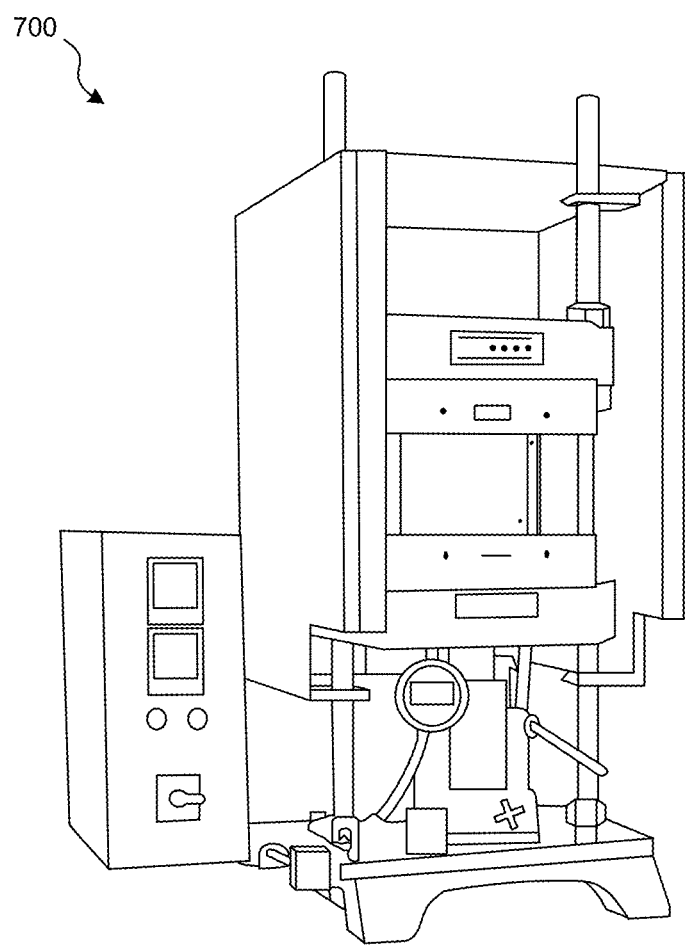
FIG. 7 is a perspective view of a lamination press, in accordance with one or more embodiments.

FIG. 7 is a perspective view of a lamination press 700, in accordance with one or more embodiments. The lamination press 700 is sometimes referred to as a "lamination hot press" or a "heat lamination press." In some embodiments, the lamination press 700 includes a hydraulic press having a pair of heated platens. The pair of heated platens is the same as or similar to the two heated platens 304*a*, 304*b* illustrated and described in more detail with reference to FIG. 3. In some embodiments, the temperatures of the heated platens are controlled by separate digital temperature controllers independently (e.g., each platen is heated up to 500° C.). The platens can be made of an alloy having a flat surface, in some embodiments, water cooling jackets are installed with the heating platens for cooling. A pressure gauge can also be mounted to monitor the pressure applied on the platens.

Figure 8:
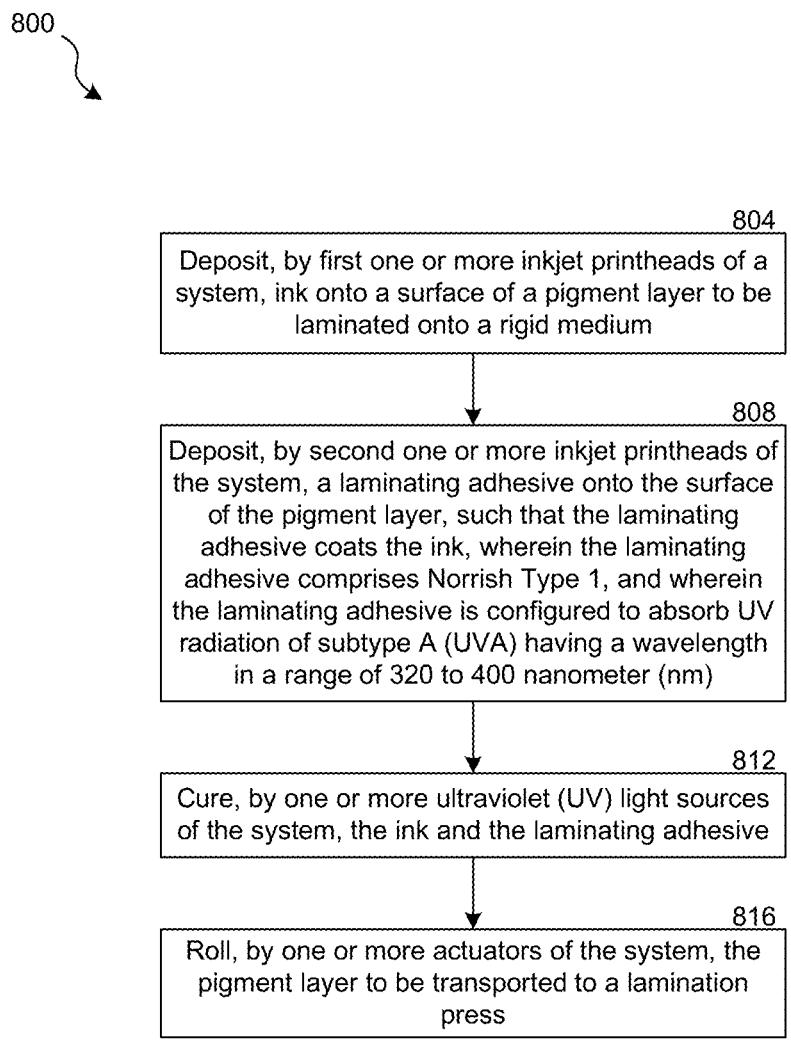
FIG. 8 is a flow diagram illustrating a process for applying UV heat-activated laminating adhesives via inkjet printing, in accordance with one or more embodiments.

FIG. 8 is a flow diagram illustrating a process 800 for applying UV heat-activated laminating adhesives via inkjet printing, in accordance with one or more embodiments. In some embodiments, the process 800 of FIG. 8 is performed using a system, e.g., the printing system 100 illustrated and described in more detail with reference to FIG. 1 or the printing system 200 illustrated and described in more detail with reference to FIG. 2. In other embodiments, the process 800 of FIG. 8 is performed using the components illustrated and described in more detail with reference to FIGS. 3 and 5. Likewise, other embodiments include different and/or additional steps, or are performed in a different order.

In step 804, first one or more inkjet printheads of a system deposit ink onto a surface of a pigment layer to be laminated onto a rigid medium. The first one or more inkjet printheads are each similar to or the same as the printer head 106 illustrated and described in more detail with reference to FIG. 1 or the printer head 202 illustrated and described in more detail with reference to FIG. 2. The ink is the same as or similar to the ink 320 illustrated and described in more detail with reference to FIG. 3. The pigment layer is similar to or the same as the pigment layer 612 illustrated and described in more detail with reference to FIG. 6. The pigment layer is a thin, flexible layer of white or light-colored PVC that is printed using the ink.

In step 808, second one or more inkjet printheads of the system deposit a laminating adhesive onto the surface of the pigment layer, such that the laminating adhesive coats the ink. The second one or more inkjet printheads are each similar to or the same as the printer head 106 illustrated and described in more detail with reference to FIG. 1 or the printer head 202 illustrated and described in more detail with reference to FIG. 2. The laminating adhesive is the same as or similar to the laminating adhesive 316 illustrated and described in more detail with reference to FIG. 3. In some embodiments, the laminating adhesive includes Norrish Type 1. In some embodiments, the laminating adhesive is configured to absorb UV radiation of subtype A (UVA) having a wavelength in a range of 320 to 400 nanometers (nm).

In step 812, one or more UV light sources of the system cure the ink and the laminating adhesive. The one or more UV light sources are the same as or similar to the one or more light sources 112 illustrated and described in more detail with reference to FIG. 1 or the light source 204 illustrated and described in more detail with reference to FIG. 2. The curing process is illustrated and described in more detail with reference to FIGS. 1 and 2. The laminating adhesive protects the surface of the pigment layer prior to the lamination process illustrated and described in more detail with reference to FIG. 3.

In step 816, one or more actuators of the system roll up the pigment layer to be transported off-line to a lamination line (lamination press) in production of LVTs. Depositing the ink onto the surface of the pigment layer 612 and curing transforms the pigment layer 612 into a decorative printed film to be laminated onto the rigid medium to construct LVTs. The lamination is performed using a lamination press, e.g., the lamination press 700 illustrated and described in more detail with reference to FIG. 7.

In some embodiments, first one or more inkjet printheads of a system deposit ink onto a surface of a pigment layer to be laminated onto a rigid medium. Second one or more inkjet printheads of the system deposit a laminating adhesive onto the surface of the pigment layer, such that the laminating adhesive coats the ink. The laminating adhesive includes Norrish Type 1. The laminating adhesive is configured to absorb UV radiation of subtype A (UVA) having a wavelength in a range of 320 to 400 nanometers (nm). One or more ultraviolet (UV) light sources of the system cure the ink and the laminating adhesive. One or more actuators of the system roll up the pigment layer to be transported to a lamination press.

In some embodiments, the pigment layer includes polyvinyl chloride (PVC). Depositing the ink onto the surface of the pigment layer transforms the pigment layer into a decorative printed film.

In some embodiments, the laminating adhesive is further configured to bond an overlay film layer to the pigment layer, the bond having a peel strength greater than 7 pound-force (lbf) or 31.1376 newtons (n).

In some embodiments, the laminating adhesive includes at least one of monomers, oligomers, at least one photoinitiator, surfactants, or polymer resins.

In some embodiments, first one or more inkjet printheads deposit ink onto a surface of a pigment layer. Second one or more inkjet printheads deposit a laminating adhesive onto the surface of the pigment layer, such that the laminating adhesive coats the ink. The laminating adhesive is configured to absorb UV radiation. One or more ultraviolet (UV) light sources cure the ink and the laminating adhesive on the surface of the pigment layer using the UV radiation.

In some embodiments, the laminating adhesive includes at least one of a polymer, a C9 hydrocarbon resin, or a triblock co-polymer based on SEB.

In some embodiments, the laminating adhesive includes Norrish Type 1.

In some embodiments, the UV radiation is of subtype A (UVA) having a wavelength in a range of 320 to 400 nanometers (nm).

In some embodiments, the laminating adhesive is further configured to bond an overlay film layer to the pigment layer, the bond having a peel strength greater than 7 pound-force (lbf) or 31.1376 newtons (n).

In some embodiments, the laminating adhesive is further configured to bond an overlay film layer to the pigment layer at a temperature in a range from 260° F. to 300° F.

In some embodiments, a first proportion of rubber within the laminating adhesive is greater than a second proportion of styrene within the laminating adhesive.

In some embodiments, the laminating adhesive includes at least one of monomers, oligomers, at least one photoinitiator, surfactants, and polymer resins.

In some embodiments, a structure includes a pigment layer having ink deposited thereupon by first one or more inkjet printheads. The structure includes a laminating adhesive deposited thereupon by second one or more inkjet printheads, such that the ink is coated by the laminating adhesive. The laminating adhesive is configured to absorb UV radiation. The ink and the laminating adhesive have been cured by one or more ultraviolet (UV) light sources, using the UV radiation.

In some embodiments, the laminating adhesive includes at least one of a polymer, a C9 hydrocarbon resin, or a triblock co-polymer based on SEB.

In some embodiments, the laminating adhesive comprises Norrish Type 1.

In some embodiments, the UV radiation is of subtype A (UVA) having a wavelength in a range of 320 to 400 nanometers (nm).

In some embodiments, the laminating adhesive is further configured to bond an overlay film layer to the pigment layer, the bond having a peel strength greater than 7 pound-force (lbf) or 31.1376 newtons (n).

In some embodiments, the laminating adhesive is further configured to bond an overlay film layer to the pigment layer at a temperature in a range from 260° F. to 300° F.

In some embodiments, a first proportion of rubber within the laminating adhesive is greater than a second proportion of styrene within the laminating adhesive.

In some embodiments, the laminating adhesive includes at least one of monomers, oligomers, at least one photoinitiator, surfactants, and polymer resins.

The techniques introduced here can be implemented by programmable circuitry (e.g., one or more microprocessors), software and/or firmware, special-purpose hardwired (i.e., non-programmable) circuitry, or a combination of such forms. Special-purpose circuitry can be in the form of one or more application-specific integrated circuits (ASICs), programmable logic devices (PLDs) field-programmable gate arrays (FPGAs), etc.

The description and drawings herein are illustrative and are not to be construed as limiting. Numerous specific details are described to provide a thorough understanding of the disclosure. However, in certain instances, well-known details are not described in order to avoid obscuring the description. Further, various modifications may be made without deviating from the scope of the embodiments.

The terms used in this specification generally have their ordinary meanings in the art, within the context of the disclosure, and in the specific context where each term is used. Certain terms that are used to describe the disclosure are discussed above, or elsewhere in the specification, to provide additional guidance to the practitioner regarding the description of the disclosure. For convenience, certain terms may be highlighted, for example using italics and/or quotation marks. The use of highlighting has no influence on the scope and meaning of a term; the scope and meaning of a term is the same, in the same context, whether or not it is highlighted. It will be appreciated that the same thing can be said in more than one way. One will recognize that "memory" is one form of a "storage" and that the terms may on occasion be used interchangeably.

Consequently, alternative language and synonyms may be used for any one or more of the terms discussed herein, but no special significance is to be placed upon whether or not a term is elaborated or discussed herein. Synonyms for certain terms are provided. A recital of one or more synonyms does not exclude the use of other synonyms. The use of examples anywhere in this specification including examples of any term discussed herein is illustrative only and is not intended to further limit the scope and meaning of the disclosure or of any exemplified term. Likewise, the disclosure is not limited to various embodiments given in this specification.

It is to be understood that the embodiments and variations shown and described herein are merely illustrative of the principles of this invention and that various modifications may be implemented by those skilled in the art.

What is claimed is:

1. A method comprising:
    disposing, by an inkjet mechanism of a laminating system, a laminating adhesive onto a particular pattern printed on a surface of a rigid medium;
    curing, by an ultraviolet (UV) light source of the laminating system, the laminating adhesive;
    positioning, by the laminating system, an overlay film layer such that a surface of the overlay film layer faces the laminating adhesive;
    applying, by a pair of stainless steel plates of the laminating system, heat to the laminating adhesive; and
    applying, by the pair of stainless steel plates of the laminating system, pressure to the overlay film layer, the laminating adhesive, and the rigid medium to laminate the overlay film layer onto the particular pattern printed on the surface of the rigid medium.

2. The method of claim 1, wherein the pressure is in a range from 1000 to 1800 pound-force (lbf), and wherein the pressure is applied for two to four minutes.

3. The method of claim 1, further comprising cooling, by the laminating system, the rigid medium for twenty-four to thirty-six hours after applying the pressure.

4. The method of claim 1, further comprising creating, by the laminating system, a bond between the overlay film layer and the rigid medium using the laminating adhesive, the bond having a peel strength greater than 7 lbf or 31.1376 newtons (n).

5. The method of claim 1, wherein curing the laminating adhesive comprises radiating the laminating adhesive using UV radiation of subtype A (UVA) having a wavelength in a range of 320 to 400 nanometers (nm), wherein the laminating adhesive comprises Norrish Type 1.

6. The method of claim 1, wherein the laminating adhesive comprises at least one of a polymer, a C9 hydrocarbon resin, or a triblock co-polymer based on styrene ethylene butylene (SEB).

* * * * *